5 Sheets—Sheet 1.
G. COOPER.
Machine for Manufacturing Needles.
No. 222,773.      Patented Dec. 23, 1879.
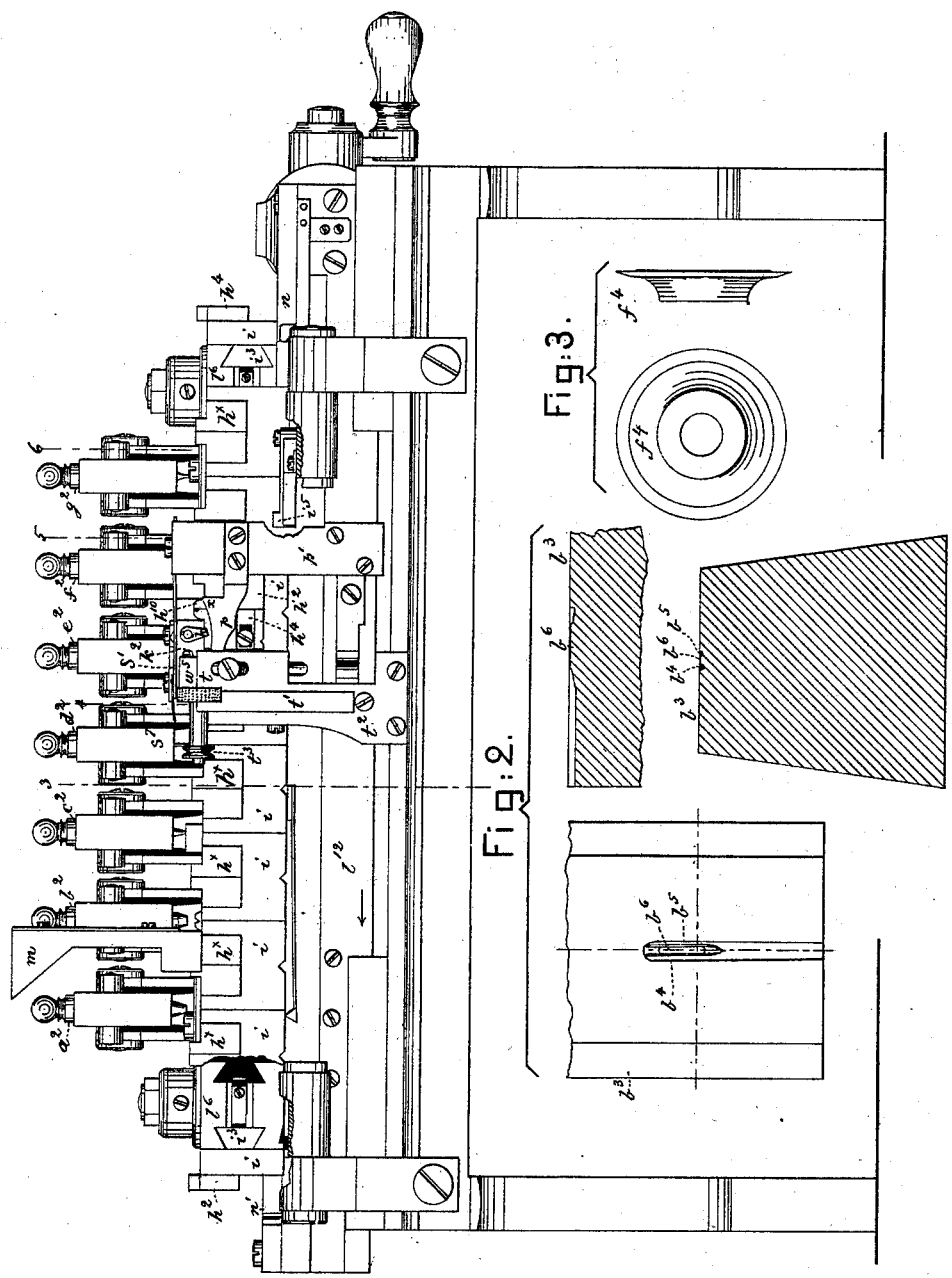
Witnesses.
L. F. Connor.
N. E. Whitney,
Inventor.
George Cooper
by Crosby Gregory
Attys G. COOPER.
Machine for Manufacturing Needles.
No. 222,773.    Patented Dec. 23, 1879.
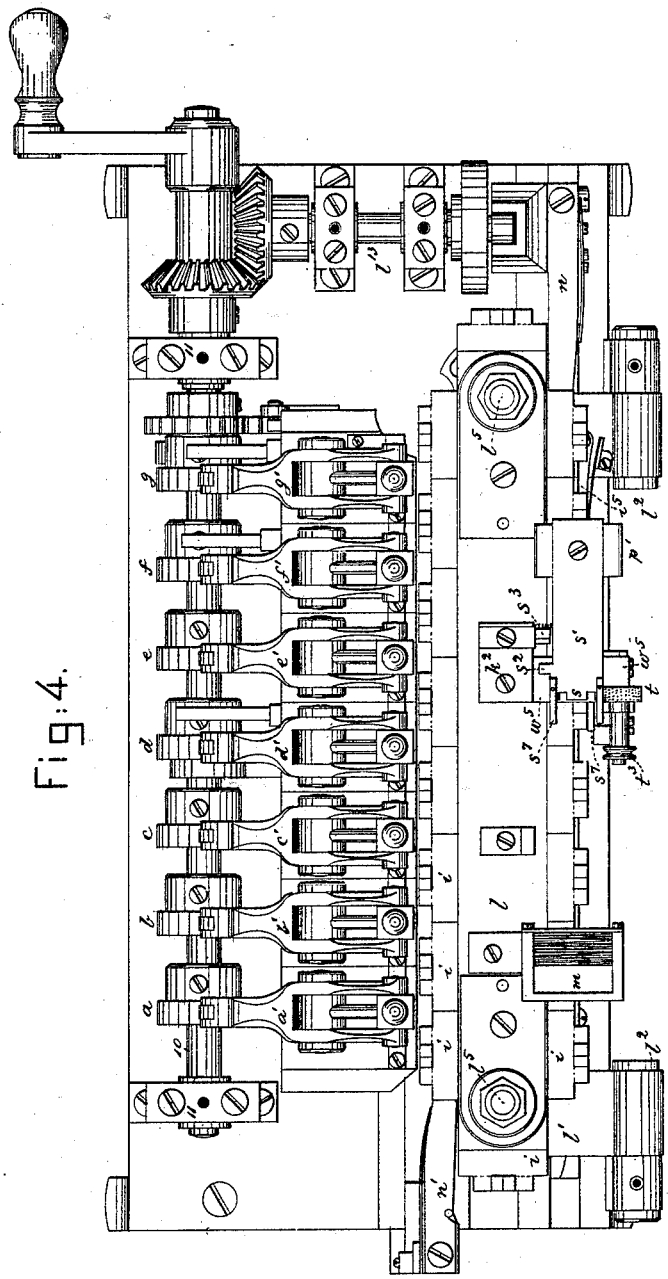
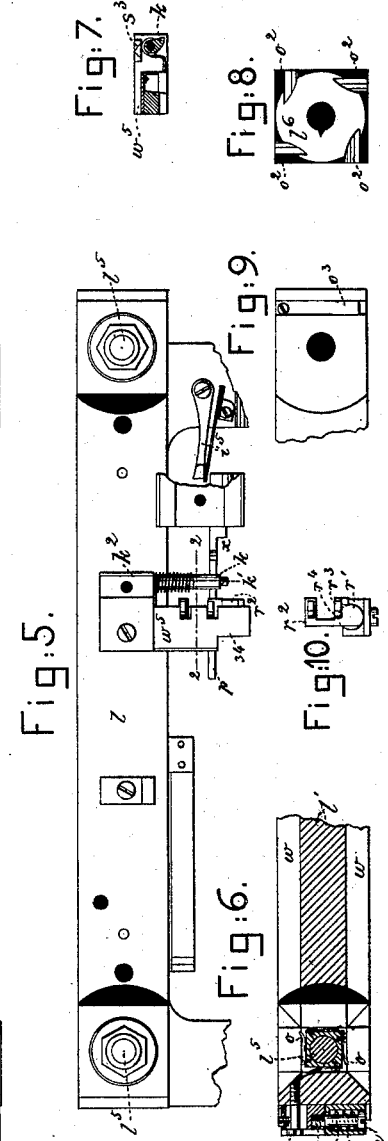
Witnesses.                Inventor.

G. COOPER.
Machine for Manufacturing Needles.
No. 222,773. Patented Dec. 23, 1879.
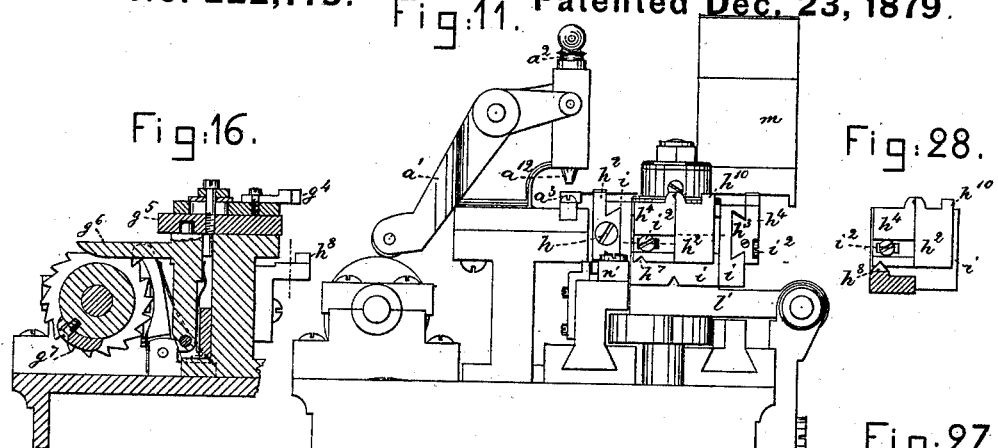
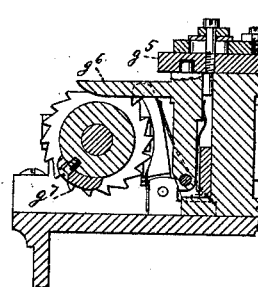
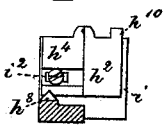
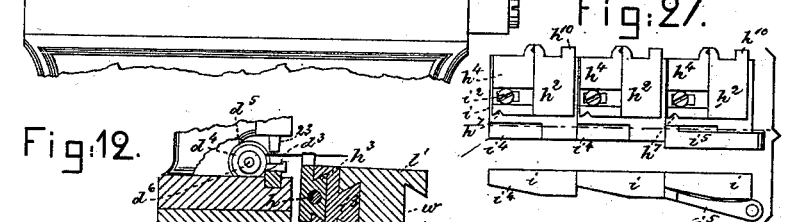
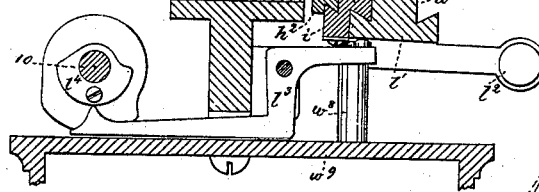
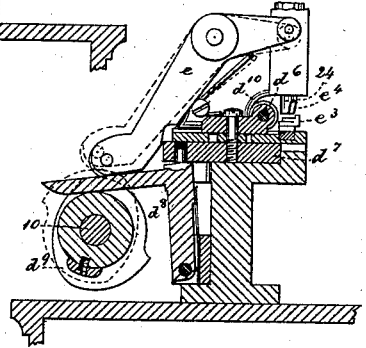
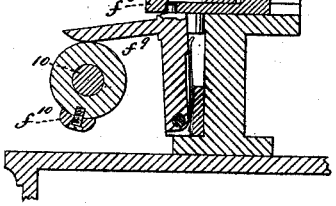
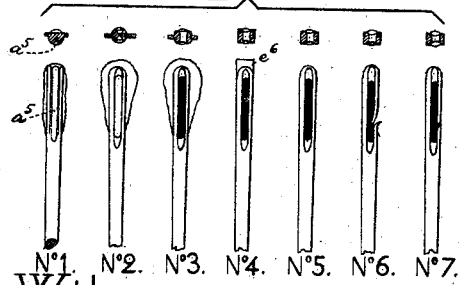
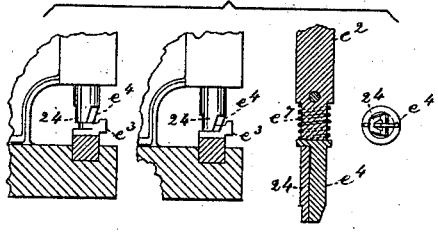
Witnesses
L. F. Connor.
N. E. Whitney.
Inventor.
George Cooper
by Crosby & Gregory
Attys G. COOPER.
Machine for Manufacturing Needles.
No. 222,773.  Patented Dec. 23, 1879.
5 Sheets—Sheet 4.
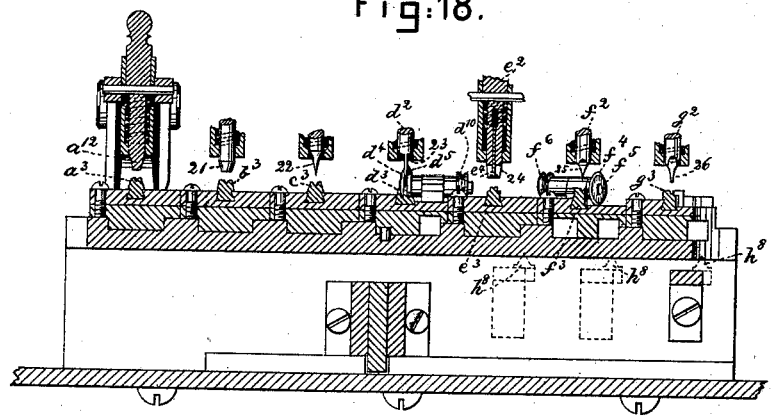
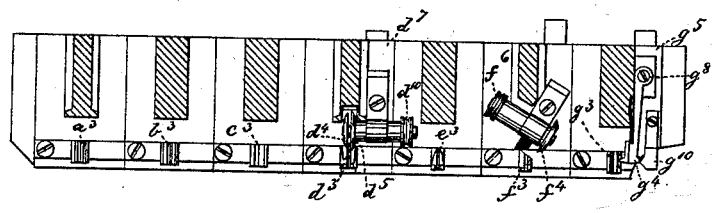
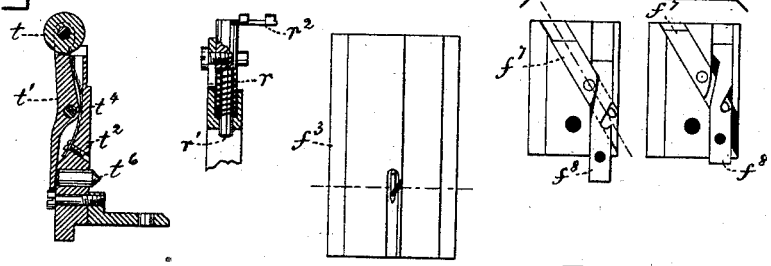
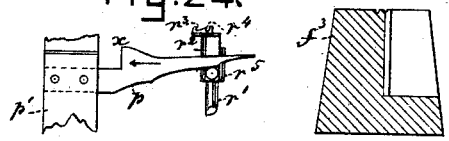
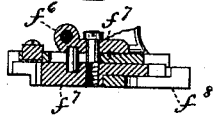
Witnesses.
L. F. Connor.
N. E. Whitney.
Inventor
George Cooper
by Crosby & Gregory
Attys 5 Sheets—Sheet 5.

G. COOPER.
Machine for Manufacturing Needles.

No. 222,773.        Patented Dec. 23, 1879.

Witnesses.
L. F. Connor.
N. E. Whitney.

Inventor.
George Cooper
by Crosby & Gregory, Attys

UNITED STATES PATENT OFFICE.

GEORGE COOPER, OF NEW BEDFORD, MASSACHUSETTS.

IMPROVEMENT IN MACHINES FOR MANUFACTURING NEEDLES.

Specification forming part of Letters Patent No. 222,773, dated December 23, 1879; application filed November 26, 1879.

*To all whom it may concern:*

Be it known that I, GEORGE COOPER, of New Bedford, county of Bristol, State of Massachusetts, have invented an Improvement in Mechanism for Manufacturing Needles, of which the following description, in connection with the accompanying drawings, is a specification.

This invention relates to improvements in machines for the manufacture of sewing-needles to be used by hand.

The mechanism herein described is adapted to make a needle with a slitted eye or side, to be threaded by drawing the thread through the said slit into the eye.

The needle-forming blanks are held in nippers loosely connected with nipper-carrying blocks made to move intermittingly about a grooved bed, which is made to rise and fall each time the blank is to be placed in position to be acted upon by a die, cutter, or other tool, a rigid finger connected with the framework of the machine acting upon the nippers as the bed is lowered to thereby place the blank in exactly the proper position; also, in a peculiar-shaped die to shape the needle head and eye, it having a central projection or teat, the grooves at each side of which are of different widths and depths to make the die strong, and enable it to form a needle with one side of the head or eye thicker than its other side; also, in other features of my invention, hereinafter more fully set forth, and claimed at the end of this specification.

Figure 25:
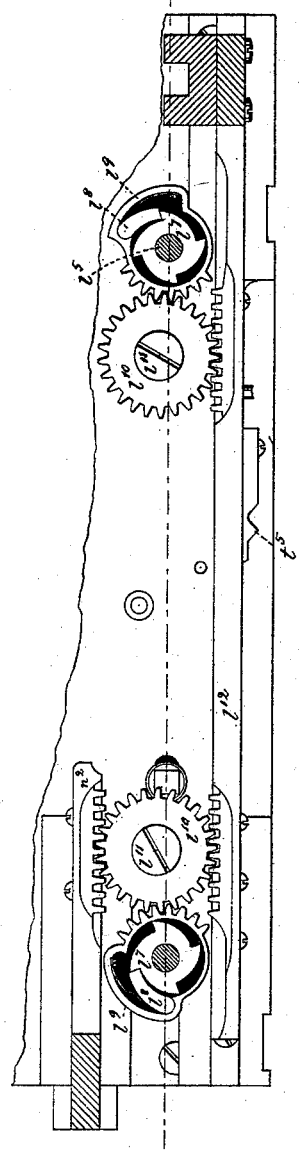
Figure 26:
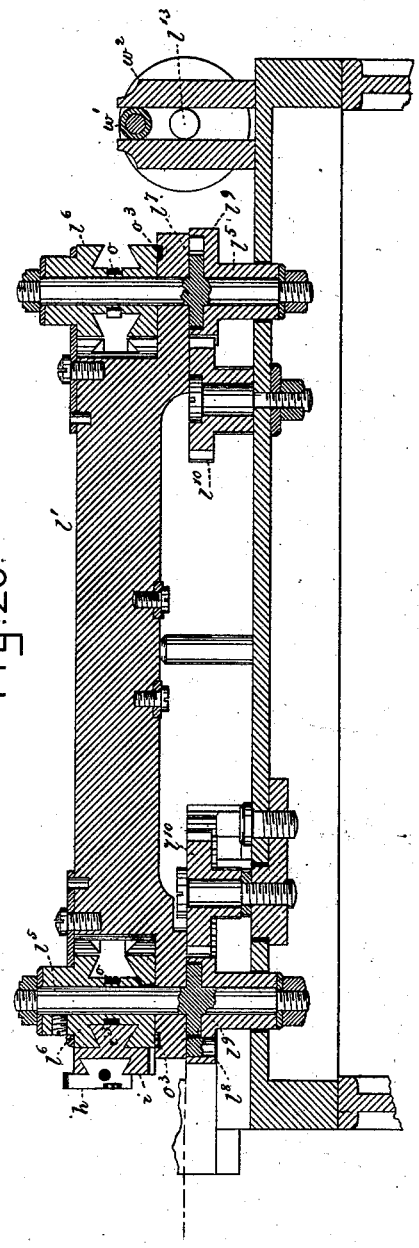

Figure 1 of the drawings represents, in front elevation, a needle-making machine embodying my invention; Fig. 2, a detail of the shaping-die; Fig. 3, details of the slitting device for cutting the side of the eye; Fig. 4, a top view of Fig. 1; Fig. 5, a detail of the top plate of the rising-and-falling bed, it showing the needle-straightening bed, the needle-lifter, its operating-cam, and nipper-opener attached; Fig. 6, a horizontal section taken through one end of the rising-and-falling bed, showing a block and nipper thereon, and a square for turning the blocks; Fig. 7, a section on the line 2 2, Fig. 5; Fig. 8, an under-side view of one of the squares removed from its post; Fig. 9, a top view of the extreme end of the bed, it showing the spring which operates in connection with the notched under side of the square represented in Fig. 8. Fig. 10 is a top view of the needle-lifter detached from the machine. Fig. 11 is a left-hand end view of Fig. 1; Fig. 12, a section taken across the machine on line 3 3, Fig. 1, opposite the cutters which turn the "flash" or surplus metal from the sides of the eye; Fig. 13, a section on the line 4 4, Fig. 1; Fig. 14, details of the cutter to remove the surplus material from the end of the head, and of the eye-entering device and bed-die; Fig. 15, a section on the line 5, Fig. 1; Fig. 16, a section on the line 6, Fig. 1; Fig. 17. details showing face views and cross-sections through the heads and eyes of the blanks, they illustrating the successive changes produced by the several devices which co-operate to form the head and eye. Fig. 18 is a longitudinal vertical section taken through the machine, showing the clamps, punches, eye-entering devices, cutters, and bed-dies, which operate upon the head of the blank successively; Fig. 19, a longitudinal horizontal section taken just above the bed-dies, and notched guides in front of them; Fig. 20, a vertical section taken through the lever which operates the buffing wheel or stone; Fig. 21, a sectional detail of the needle-lifting device, which elevates the needle from the nippers preparatory to placing it upon the needle straightening or rolling bed; Fig. 22, an under-side view in two different positions of the carriage which moves the slitting-cutter; Fig. 23, a section on the dotted line, Fig. 22; Fig. 24, a detail of the device for operating the lifter shown in Figs. 10 and 21. Fig. 25 is a section on the dotted line Fig. 26. Fig. 26 is a section on the dotted line Fig. 25. Fig. 27 represents the nippers in detail. Fig. 28 shows a nipper supposed to be in place in front of a die, the finger for centering the nipper being shown in section; and Fig. 29, a top view and cross-section of the die which supports the blank when the side of the eye is slitted.

In the embodiment of my invention (represented in the drawings) the main shaft 10 of the machine, mounted in bearings 11, attached to the frame-work, which is of suitable shape to sustain the working parts, has a series of cams, $a\ b\ c\ d\ e\ f\ g$, each adapted to operate a suitable lever, $a'\ b'\ c'\ d'\ e'\ f'\ g'$, attached to the bars $a^2\ b^2\ c^2\ d^2\ e^2\ f^2\ g^2$, guided in suitable heads provided at their lower ends with stamps, punches, and with entering devices for the eyes of the blanks, each one of the said parts carried by the bars co-operating with its own proper die $a^3$ $b^3$ $c^3$ $d^3$ $e^3$ $f^3$ $g^3$.

The stamp $a^{12}$ and die $a^3$ receive the end of the wire or blank to be made into a needle and groove the blank at its under side, as at $a^5$, (see No. 1, Fig. 17,) to form or assist in forming the depression for the eye. From die $a^3$ the blank No. 1 is transferred, as will be hereinafter described, into position to be acted upon by the stamp 21 and die $b^3$, they shaping the blank as in No. 2, Fig. 17, wherein it will be noticed that the head of the blank has two depressions formed in it, one at each side, the said depressions varying in depth from end to end, being deepest at or near the central portions of the length of the grooves, and depressing the metal most just where the punch 22 is to operate to form the opening for the eye.

The stamp 21, carried by bar $b^2$ and the die $b^3$, besides grooving the head of the blank, as just described, also defines the shape of the outer portion of the head of the needle about the eye and the thickness of the walls of the eye, and, as shown in this instance of my invention, makes one of the side walls of the eye heavier than the other.

Referring to Fig. 2, showing the said die $b^3$ enlarged, it will be noticed that the grooves $b^4$ $b^5$, cut into the die-block to form the projection or teat $b^6$, are cut of different widths, so as to throw the teat to one side of the die, so that as the die and stamp operate upon the blank they leave more metal at one side of the eye (as shown in Fig. 17, the left-hand side of the said eye) than at the other side.

If both sides of the eye are made of equal strength or size, and one side is slitted, as hereinafter described, then the metal left in the unslitted side has not, it has been found in practice, sufficient strength for practical work; but by increasing the quantity of metal in one side of the eye, and consequently the strength of that side, and by slitting the weaker side for the purpose of threading, I am enabled to make a strong and serviceable needle.

The die $b^3$, it will be noticed, is grooved at one side of the teat much deeper than at the other side. If the grooves were of equal depth, one being wider than the other, the teat would be unequally strained by the metal being driven down by the stamp into the said grooves about the teat, and the teat, being very narrow, would be broken.

To obviate this breaking of the teat, I make one groove (the narrow one) of less depth than the broad one, thereby supporting the teat higher up upon that side, which enables the teat to withstand the strain of the metal in the deeper and wider groove.

Locating and supporting the teat in this way, it having at its opposite sides grooves of different width and depth, constitutes a very essential feature of this my invention and makes practical the manufacture of slit-eyed needles by machinery.

If the machine was to make the common hand-needle, the die $b^3$ would be grooved equally at each side of the teat.

After the eye is operated upon by the stamp 21 the blank is removed and placed under the punch 22, carried by the bar $c^2$, the punch co-operating with a die, $c^3$, having a hole down through it and punching from the blank a portion of the metal inside the grooves made by the stamp 21, leaving an open eye or passage, as denoted in heavy black lines. (See No. 3, Fig. 17.) This blank shown at No. 3 is then placed under the eye-entering device 23, at the lower end of bar $d^2$, which, as it descends, enters the eye and serves to hold the blank in correct position on the die-bed $d^3$, while two rotating disk cutters or saws, $d^4$ $d^5$, on a shaft, $d^6$, mounted in bearings suitably attached to a sliding carriage, $d^7$, (see Fig. 13,) are moved forward along the head end of the blank or at the sides of the eye, the said saws removing the flash or surplus metal from the eye-forming portions or walls of the needle. These saws are preferably of unequal diameter, to enable one to operate upon the metal at one side of the eye in advance of the other, which operates thereon at the opposite side, thereby reducing the strain upon the saws.

The carriage $d^7$ for the said shaft $d^6$ is moved forward at the proper time by means of a lever, $d^8$, operated by a cam, $d^9$, a suitable spring moving the carriage backward; or it may be moved both backward and forward by a cam having a groove in its face, a pin upon the carriage entering the groove of the cam. This shaft $d^6$ has upon it a pulley, $d^{10}$, (upon which is a belt suitably operated upon by a belt-tightener to provide for movement of the carriage,) which may be rotated to operate the saws.

After trimming the sides of the eye, as represented in No. 4, the blank is moved under the cutter 24 at the lower end of the bar $e^2$, and laid upon or in the holding-die $e^3$, (see Figs. 13, 14,) where the flash or surplus metal at the end of the blank and eye is cut away.

An eye-entering device, $e^4$, fitted within a grooved portion of the bar and cutter, and held down by a spring, $e^7$, enters the eye, and, co-operating with the die-bed $e^3$, holds the blank firmly, while the end-cutter 24 trims the end of the head, leaving it as represented at No. 5, Fig. 17.

The spring $e^7$ (see Fig. 14) holds the portion $e^4$ down, and permits it to yield as the cutter 24 trims the head.

The said Fig. 14 shows at the left-hand diagram the portion $e^4$ as holding the blank, and the cutter 24 as just commencing to cut, and the next diagram shows the cutter 24 as having performed a cutting operation. This last operation completed the eye, and would be all that would be required for the eye of a common hand-needle.

The blank No. 5 is next presented to the action of the eye-entering device 25 at the end of bar $f^2$, it co-operating with a proper support or die, $f^3$, to hold the blank firmly in position. This die $f^3$ is slotted at one side, (see Fig. 29,) and the eye-entering device 25 is so shaped that the slitting-cutter $f^4$, mounted upon a rotating shaft, $f^5$, having a belt-pulley, $f^6$, operated upon by a band or belt in any suitable way, may operate to pass the edge of the cutter through the said slot and slit the eye open at its thinnest or weakest side, as shown at No. 6, Fig. 17.

The shaft $f^5$ is supported upon a suitable carriage, $f^7$, adapted to move diagonally. (See Fig. 19.) This carriage $f^7$ is actuated by a cam-slide, $f^8$, (see Fig. 22,) which shows an under-side view of the carriage and the cam-slide, the left-hand diagram showing the carriage in its backward position, and the right-hand diagram the carriage in its forward position.

The cam-slide $f^8$ is, in this instance, moved horizontally by means of a lever, $f^9$, actuated by a cam, $f^{10}$, the lever being connected with the slide by a pin, as in Fig. 15.

After the eye is slitted, as described, the blank No. 6 is moved under the eye-entering punch 26, carried by the bar $g^2$, and the said punch, co-operating with a suitable die-bed, $g^3$, enters the eye and carries outward the longer portion of the slit side of the eye, left by the slitting-cutter in the position shown in No. 6, and at the same time the eye-closer $g^4$, pivoted upon a reciprocating carriage, $g^5$, set in motion by a suitable lever, $g^6$, acted upon by a cam, $g^7$, is moved so as to operate upon the shorter side piece of the slit side of the eye outside the eye. The pivoted eye-closer attached to the said carriage at $g^8$, as the carriage is drawn toward the shaft 10, brings a portion at the rear of the closer against a cam, $g^{10}$, and causes the closer to act upon the shorter portion of the eye next the slot cut through the side of the eye, thereby straightening the slotted side of the eye and closing the said eye, as shown at No. 7, Fig. 17.

The blanks operated upon, as hereinbefore described, were, during the time they were being presented to the stamps, punches, cutters, &c., held between nippers mounted upon independent blocks moved progressively forward.

The completed nipper is shown in Fig. 11, end view; Fig. 6, in section, and in detail, Figs. 27 and 28.

Each nipper is composed of a part, $h^2$, having a projection, $h^3$, to fit a groove in the face of the block $i$, and of a part, $h^4$, having attached to it a projection like $h^3$, to also fit the same groove in the block, and the two parts $h^2$ and $h^4$ are connected together by a headed pin, $h$, fixed upon one part and extended into a hole in the other, the said pin being provided with a spring, $h^6$, which acts to hold the members $h^2$ $h^4$ of the nippers together, so that they may be separated to act as spring-nippers to clamp a needle-blank.

The member $h^4$ has a slot made through it to receive a screw, $i^2$, (see Fig. 11,) which holds the nipper upon the block $i$, and permits it to have a slight longitudinal movement thereon.

The lower edge of the part $h^4$ of the nipper has a notch, $h^7$, which, at the proper time, (as when the bed $l'$, carrying the blocks, is lowered, as will be hereinafter described,) comes substantially above a finger, $h^8$, which forms one member of a nipper-centering device, and the said finger enters the said notch $h^7$, which forms the second member of the nipper-centering device, and moves the nipper upon the carrying-block $i$ either to the right or left, as may be necessary to insure that the nipper centers the blank and places it squarely in the die. One of these fingers is shown in dotted lines at the right of Fig. 18, and in Figs. 16 and 28, it being understood that in practice one of said fingers is correctly placed below each die to co-operate with each nipper each time it is stopped in front of a stamp, punch, or other tool which is to operate upon the blank or needle held by the said nipper.

The member $h^2$ of the nipper has a shoulder, $h^{10}$, which, at the proper time, is acted upon by the nipper-opener $k$, attached to a stud, $k'$, of a block, $k^2$, connected with the top plate, $l$, of the rising-and-falling bed $l'$, pivoted at $l^2$ upon the frame of the machine, and raised and lowered by the lever $l^3$, vibrated by the cam $l^4$ on the shaft 10, or by other equivalent or suitable mechanism. This provision for raising and lowering the bed permits the blanks held by the nippers to be settled or placed into the hollow of the grooves of the usual guiding-notches in line with and in front of the dies. In this machine each nipper carries the blank held firmly by it, while each stamp, punch, and the several cutters operate upon it to make and finish the eye of the needle. The nippers release their blanks just as they are to be straightened by rolling.

All the several stamps, dies, and cutters operate simultaneously upon a number of blanks, each operation upon each blank differing from the operation upon an adjacent blank.

At the ends of the rising-and-falling bed $l'$ are posts $l^5$, provided with squares $l^6$, having their four sides suitably grooved to receive dovetailed projections $i^3$ at the backs of the movable loose blocks $i$, to which the nippers are attached. This bed $l'$ is provided at its sides (see Fig. 12) with corresponding grooves $w$, to guide the blocks $i$ from end to end of the bed, and each block in its turn, as it is moved into the groove at the then outer face of the left-hand square of the bed, is, by the progressive quarter-rotation of the said square, carried from the front line of the bed about the post and into line with the back of the bed.

Before being changed from the front to the back of the bed each nipper is supplied with a blank from a hopper, $m$, of usual construction, at the front of the bed, the nipper being temporarily opened below the hopper by a suitable nipper-opener, not herein shown in position, but which may be made substantially as the nipper-opener $k$.

The nippers, as the blanks are moved along the bed, retain the blanks and present them progressively and successively as the blocks are moved horizontally to each tool or device employed to complete the eye.

Each post $l^5$ has fixed at its lower end a ratchet, $l^7$, having four teeth, (see Fig. 25,) which are engaged by a pawl, $l^8$, on a pawl-carrier, $l^9$, made as a sleeve, fitted to the post $l^5$, each pawl-carrier being provided with gear-teeth, as shown in the drawings, to be engaged by the teeth of a gear-wheel, $l^{10}$, loosely mounted upon a fixed stud, $l^{11}$, the said gear-wheel $l^{10}$ being reciprocated about its stud by means of a reciprocating toothed rack, $l^{12}$, actuated by a crank-pin, $w'$, at the end of a shaft, $l^{13}$, operated from shaft 10, the said crank-pin, as shown in the drawings, entering a slot in a head, $w^2$, attached to the rack. This rack $l^{12}$ has two series of teeth, as shown in Fig. 25, to actuate the wheels $l^{10}$ at each end of the bed $l'$, they moving the pawls and turning the squares intermittingly.

Each block $i$ will, in practice, have at its face a groove, $i^4$, to receive within it a holding-pawl, $i^5$, which is thereby permitted to serve as a stop to act upon the rear end of a block next in advance of that one in whose groove the pawl then rests to prevent the said block from being moved backward, as hereinafter described.

The rack-bar $l^{12}$ has pivoted at its right-hand end a pawl, $n$, which, as the rack-bar is moved in the direction of the arrow, Fig. 1, acts upon the rear side of that block $i$ which then rests at the front side of the square $l^6$ at that end of the bed, and moves the block acted upon by it from the front side of the square into the groove $w$ at the outer face of the bed, and at the same time each block acts upon and moves the block next in advance of it, the last block of the series at the front of the bed at the left being moved into a groove in that face of the left-hand square which is then at the front.

As the left-hand square presents, at the rear of the bed, a block taken by it from the front of the bed, a pawl, $n'$, carried by a short rack bar, $n^2$, moved by gear $l^{10}$, strikes and moves the said block from the then rear face of the square into the groove at the rear side of the bed, and this pawl $n'$, by its action successively upon the blocks $i$, moves each block and the whole series of blocks in advance of it at the rear of the bed progressively forward past the several tools which make the eye, as before described, the square at the right-hand end of the bed bringing the blocks, nippers, and their blanks having the eyes finished forward into line at the front of the bed at its right-hand end.

At each face of the squares, and within their grooves, are placed springs $o$, (see Figs. 6 and 26,) to retain the blocks in correct position with relation to the faces of the squares, the free end of each spring acting against a small projection at the rear side of each block, as shown in Fig. 6. Each square is provided at its lower side (see Fig. 8) with shoulders $o^2$, which, as the squares come into correct position, are acted upon by springs $o^3$ in grooves at the upper sides of the bed at its ends (see Fig. 9) to retain the squares in place.

Each block $i$, its nipper having a needle the eye of which has been properly shaped, as described, as the blocks are brought in front of the bed at the right, is opened by the nipper-opener $k$. When a nipper with a needle comes into position to be acted upon by the needle-lifter, a projection, $x$, at the upper edge of a cam-finger, $p$, strikes the nipper-opener, held loosely upon its stud, and pressed downward by a spring, (see Fig. 5,) and turns the nipper-opener about its stud far enough to strike the projection $h^{10}$ at the top of the member $h^2$ of the nipper, so as to move it away from the member $h^4$ of the nipper and release the needle, the pawl $i^5$ then acting upon the rear end of the second block, in the rear of the block carrying the said nipper, (see Fig. 27,) preventing it from being moved backward. The cam-finger is connected with a bracket, $p'$, of the rack-bar $l^{12}$, and is moved with the rack-bar.

The lower edge of the cam-finger is so shaped (see detail, Fig. 24) that as the finger is moved backward in the direction of the arrow, as just described, the spring $r$ on the stem $r'$ of the needle-lifter $r^2$, having at its top two lugs, (see Fig. 21,) each provided with two grooves, $r^3$ $r^4$, is permitted to raise the said lifter, so that the needle held by the nippers is first received into the notches $r^3$, and as the needle-lifter rises the said needle is removed from the nippers by it. The needle being so lifted is next acted upon by the needle-pusher $s$ at the extreme forward end of the rolling or straightening plate $s'$, attached to the bracket $p'$, (the rack-bar then moving the said parts forward,) and the needle is by the said pusher carried forward from the notches $r^3$ of the lifter $r^2$ into the notches $r^4$. During this removal of the needle from the notches $r^3$ to the notches $r^4$ the lifter is allowed to descend a very little, and the notches $r^4$ are then so placed, with relation to the surface of the needle-rolling bed $w^5$, as to insure the placing of the needle to be rolled and straightened exactly at right angles to the direction of rotation of the straightening or rolling plate; and, also, as the said plate $s'$ is being moved forward, a projection, $s^2$, of the plate $s'$ meets a $\wedge$-shaped cam, $s^3$, (see Fig. 4,) and lifts the end of the said plate high enough above the rolling-bed and lifter to lift the pushing-face of the pusher $s$ above the needle, and while the needle is held by the grooves $r^4$ of the lifter the said pusher so raised above the body of the needle passes beyond the needle, after which the plate $s'$ is permitted to descend (it being a spring-plate) directly upon the needle, and the lifter is fully lowered, and the needle, then held only between the smooth lower surface of the said plate $s'$ and the face of the rolling-bed, is, by the forward motion of the said plate, rolled over the said bed and straightened. This rolling-plate has at one edge a recess, 34, which is of sufficient size to permit the head of the needle to project beyond the said bed, so that a rotating buffing wheel or stone, $t$, on a lever, $t'$, upon the bracket $t^2$, connected with the frame-work of the machine, is permitted to operate upon the said head as the needle is rotated, to thereby buff, grind, or finish the said head.

The shaft upon which is mounted the buffing-wheel has a pulley, $t^3$, to be driven by a suitable belt, and the lever $t'$ is moved on its axis $t^4$, so as to move the wheel longitudinally along the head of the needle, by means of a cam-projection, $t^5$, on the rack-bar $l^{12}$, a suitable spring moving the lever in an opposite direction. (See Fig. 20.) A loose pin, $t^6$, is placed between the lever $t'$ and the cam $t^5$.

The lower portion of the cam-finger is shaped to provide for the proper rise and fall of the lifter at the desired intervals of time, a pin, $r^5$, on the stem or rod $r'$ bearing against the said lower portion of the said cam-finger.

The rolling and straightening plate $s'$ in advance of the pusher portion $s$ has two spring-fingers, $s^7$, which extend forward and bear upon the bed while the pusher is acting to transfer the needle from one to the other set of grooves of the lifter, the said spring-fingers preventing the needle from being thrown from the lifter.

In this my machine it is obvious, instead of the exact mechanism shown in the drawings, that I may employ other well-known mechanical equivalents for producing the movements.

When the several blanks being operated upon are to be changed from one die to another, the bed is lifted in order to lift the blanks from the dies preparatory to moving the blocks and nippers laterally.

In the drawings I have shown a number of the nippers as fixed—viz., all those marked $h^\times$; but it will be understood that in practice all the nippers will be made as those marked $h^2$ $h^4$, (hereinbefore fully described,) and all the nippers will be loosely connected with the blocks, and the blocks will be grooved, as at $h^7$, to be centered properly with reference to the tools operating to form the head and eye.

The rod $w^8$ on the frame-work $w^9$ serves as a rest for the bed $l'$ when in its lowest position.

The needle-machine on which the inventions embraced in the several claims to this application constitute improvements was invented by Charles D. Wrightington, deceased, who resided at Fairhaven, Massachusetts. As invented by the said Wrightington, the machine embodied the rising-and-falling bed, the series of independent nipper-carrying blocks, the intermittingly-operated squares and posts for supporting them, the pawls and ratchets, toothed pawl-carriers, pinions and rack-bars for operating the squares, and the block-holding pawl, all as described herein and shown in the accompanying drawings, and in addition thereto a stamp and die to shape the blank to form the head of the needle, a punch and die to punch the eye, a rotating cutter to trim the surplus material from the head at one side of the eye, a cutter to trim the surplus material from the other side of the eye and the end of the head, a slitting-cutter to cut a slit through one side of the eye, and a device for closing the eye, these additional devices being operated by means of the cams of the cam-shaft, the pivoted levers, the bars or plungers, and the reciprocating carriages herein described and shown in the accompanying drawings, for operating the punches, rotating cutters, the reciprocating cutter, and the eye-closer of this my improved machine.

I do not, therefore, claim the machine invented by the said Wrightington, nor any part thereof enumerated above, but restrict my claim to the improvements which I have made thereon.

I claim—

1. A series of dies to shape and form the eye of a needle, and a series of fingers or centering devices fixed or located with relation to the said dies as described, combined with a series of loosely held or supported nippers, to permit the said nippers to move laterally, as may be required, with relation to the fixed dies and fingers, to correctly place the blanks into the dies, substantially as described.

2. The combination, with the rising-and-falling bed and series of independent movable blocks connected therewith, of nippers loosely connected with the said blocks, to permit them and the blanks held by them to be moved laterally with relation to the said blocks, substantially as described.

3. The rising-and-falling bed and a series of movable blocks with loosely-connected nippers, as described, and fingers fixed with relation to the dies, as set forth, to co-operate with the loosely-connected nippers as the bed is lowered, to thereby center the nippers and their blanks correctly with relation to the devices which operate to form the eye and head of the needle, substantially as described.

4. In a needle-making machine, a pair of nippers to grasp and hold the needle-blank, and a device to enter the eye of a needle-blank, combined with a movable carriage provided with two rotating disk-cutters to operate upon opposite sides of the blank at its head, to remove the flash or surplus metal outside the side walls of the eye, substantially as described.

5. In a needle-making machine, the cutter to shear off the end of the head of the needle outside the end wall of the eye, combined with a holding device carried by the said cutter, the holding device entering the eye of the needle-blank and holding the said needle-blank in position, substantially as described.

6. A needle-head and eye-shaping die provided with a teat located at one side of the center of the die, and grooved, as described, the narrower groove at the side of the teat being of less depth than the wider groove to thereby strengthen the teat, substantially as described.

7. The combination, with the nippers to hold the needle, and a nipper-opener, and a straightening-plate and pusher, of a lifter provided with two grooves, one to receive a needle from a nipper, and another to hold the needle at right angles to the direction of movement of the straightening-plate and pusher, substantially as described.

8. The lifter provided with two sets of grooves, combined with a pusher, a straightening-plate, a cam to lift the straightening-plate as it is moved forward, and a straightening-bed, substantially as described.

9. A straightening-plate provided with spring-fingers and a lifter, combined with a straightening-bed, substantially as described.

10. A lifter provided with a groove to receive the needle from a nipper and a groove to hold the needle at right angles to the direction of movement of the straightening-plate, combined with a straightening-plate and pusher, substantially as described.

In testimony whereof I have signed my name to this specification in the presence of two subscribing witnesses.

GEO. COOPER.

Witnesses:
CHARLES W. CLIFFORD,
THEO. F. TILLINGHAST.